United States Patent [19]

Polmanteer

[11] 4,444,940
[45] Apr. 24, 1984

[54] HIGH STRENGTH, HEAT CURABLE POLYORGANOSILOXANE ELASTOMER COMPOSITIONS AND METHOD FOR PREPARING SAME

[75] Inventor: Keith E. Polmanteer, Weidman, Mich.

[73] Assignee: Dow Corning Corporation, Midland, Mich.

[21] Appl. No.: 507,264

[22] Filed: Jun. 23, 1983

[51] Int. Cl.$^3$ .............................................. C08L 57/02
[52] U.S. Cl. .................... 524/500; 524/860; 525/477; 528/24; 528/32; 528/33
[58] Field of Search ............................ 528/24, 32, 33; 524/500, 860; 525/477

[56] References Cited

U.S. PATENT DOCUMENTS

| | | | |
|---|---|---|---|
| 2,803,619 | 8/1957 | Dickmann | 525/477 |
| 2,819,236 | 1/1958 | Dickmann | 525/477 |
| 3,219,726 | 11/1965 | Bailey et al. | 525/477 |
| 3,341,490 | 9/1967 | Burdick et al. | 524/500 |
| 3,436,366 | 4/1969 | Modic | 525/477 |
| 3,652,475 | 3/1972 | Wada et al. | 525/477 |
| 4,355,121 | 10/1982 | Evans | 524/500 |

*Primary Examiner*—Melvyn I. Marquis
*Assistant Examiner*—D. LeRoy
*Attorney, Agent, or Firm*—Robert Spector

[57] ABSTRACT

This invention provides heat curable compositions comprising a high viscosity, peroxide curable polydiorganosiloxane, a relatively low viscosity liquid diorganoalkenylsiloxy endblocked polydiorganosiloxane, a reinforcing filler and an effective amount of a vinyl specific organic peroxide. The tensile and recovery properties of the cured elastomer are optimized when the concentration of diorganoalkenylsiloxy groups on the liquid polydiorganosiloxane relative to the concentration of repeating units in the peroxide curable polydiorganosiloxane is within specified limits.

17 Claims, No Drawings

HIGH STRENGTH, HEAT CURABLE POLYORGANOSILOXANE ELASTOMER COMPOSITIONS AND METHOD FOR PREPARING SAME

BACKGROUND OF THE INVENTION

1. Field of the Invention

This invention relates to heat vulcanizable polyorganosiloxane elastomer compositions. More particularly, this invention relates to novel polyorganosiloxane compositions that can be cured at elevated temperatures to yield elastomers exhibiting desirable combinations of physical properties such as tensile strength, elongation and tear strength.

2. Description of the Prior Art

The physical properties of polyorganosiloxane elastomers can be improved using a number of methods discussed in the prior art. These methods include addition of inert reinforcing fillers, such as finely divided silica, and/or crosslinking agents that react to form chemical bonds between adjacent polyorganosiloxane molecules.

One of the earliest methods for curing polyorganosiloxanes, for example trimethylsiloxy endblocked polydimethylsiloxanes, employs an organic peroxide such as dibenzoyl peroxide. Dibenzoyl peroxide is an example of a nonvinyl specific peroxide which decomposes relatively rapidly at elevated temperatures forming free radicals that react with the polysiloxane by removal of hydrogen atoms from methyl groups to form free radicals that, in turn, react with one another during the curing reaction to form a covalent bond, thereby joining together two polymer mer units. The sites at which these chemical crosslinks form using nonvinyl specific peroxides are likely 2 combinations of intra and intermolecular crosslinks that exist as clusters of crosslinks. This type of crosslinking is apparently unfavorable for such properties as recovery and/or compression set.

It was subsequently found that certain recovery properties of cured polydiorganosiloxanes can be improved by replacing vinyl-free polydiorganosiloxanes or those containing only terminal vinyl radicals with ones containing nonterminal vinyl radicals at randomly spaced intervals along the polymer molecules. Typically such polymers contain one vinyl radical per 300 to 800 diorganosiloxane units, and are cured using vinyl-specific peroxides, such as 2,5-dimethyl-2,5-di-t-butylperoxyhexane or dicumyl peroxide, that react preferentially with vinyl radicals and introduce one crosslink for each vinyl radical. The cured polydiorganosiloxanes exhibit improved compression set values relative to polymers which do not contain vinyl radicals along the polymer molecule, however the elongation and tear strength of these vinyl-containing polymers following post-curing are not high enough for certain end-use applications, particularly those during which the elastomers are subjected to high stress at elevated temperatures.

U.S. Pat. No. 2,803,619, which issued on Aug. 20, 1957 to Dickmann, teaches improving the compression set of siloxane elastomers by combining a nonalkenyl containing polydiorganosiloxane gum with a vinyl-containing polysiloxane containing at least 12 silicon atoms per molecule. The resultant mixture contains one vinyl radical for each 20 to 5,000 silicon atoms and is cured using an organic peroxide. The cured compositions exemplified in this patent exhibit improved compression set values relative to a control prepared without any vinyl-containing polymer, however this improvement is achieved at the expense of maximum elongation, i.e., elongation at break, which decreases from 310 percent for the control to a maximum of 260 percent for a sample containing 10% by weight of vinyl-containing polyorganosiloxane.

In U.S. Pat. No. 2,819,236, which issued on Jan. 7, 1958, Dickmann discloses the preparation of polyorganosiloxane elastomers having durometer values of less than 30 by curing a mixture containing 100 parts by weight of a polydiorganosiloxane gum and from 10 to 35 parts of a fluid containing phenylmethylsiloxane and either alkylvinylsiloxane or phenylvinylsiloxane units. Specified amounts of dimethylsiloxane and dimethylalkyl- or dimethylvinylsiloxane units are also present in the fluid, which exhibits a viscosity of less than 1 m$^2$/sec at 25° C. The compositions are cured using an organic peroxide. As in the case of the aforementioned U.S. Pat. No. 2,803,619 the desired property, in this instance a low durometer value, is achieved at the expense of maximum elongation. The one reported maximum elongation value for a post cured composition is 580%. This sample was post cured for 24 hours at a temperature of 250° C.

U.S. Pat. No. 3,652,475, which issued to T. Wada and K. Stoh on Mar. 28, 1972, discloses peroxide-curable polyorganosiloxane compositions containing (a) 100 parts by weight of a polydiorganosiloxane having an average degree of polymerization of at least 3,000 and containing either no vinyl-containing siloxane units or from 0.02 to 0.3 mole percent of vinyl-containing siloxane units, (b) from 1 to 10 parts by weight of a polydiorganosiloxane having an average degree of polymerization of at least 3,000 and containing from 5 to 20 mole percent of vinyl-containing siloxane units and (c) from 0.5 to 5 parts by weight of a polydiorganosiloxane having an average degree of polymerization of from 10 to 1,000 and containing from 5 to 90 mole percent of vinyl-containing siloxane units. The alleged benefits of higher tear strength, resiliency and lower compression set are obtained at the expense of maximum elongation, which is 580% and 530% for the two samples that are post cured for 24 hours at 250° C. Post-curing under these conditions is required for elastomers that are expected to retain their tensile and recovery properties and dimensions during exposure to temperatures above about 150° C.

An objective of this invention is to provide peroxide-curable polyorganosiloxane elastomer compositions that retain useful levels of elongation, tensile strength, tear strength and elastic recovery following exposure to temperatures above 200° C. for extended periods of time. These properties are particularly desirable for elastomer articles that are subjected to stresses such as repeated flexing, tension and friction at temperatures above 100° C. during use. Specific examples of such articles are conveyor belts, drive belts, hoses and tubing connecting moving parts, flexible molds, and seals between a moving part, such as a rotating shaft and a stationary body such as a motor housing.

It has now been discovered that the aforementioned objective can be achieved using the curable elastomer compositions of this invention.

SUMMARY OF THE INVENTION

This invention provides heat curable compositions comprising a peroxide curable polydiorganosiloxane, a relatively low viscosity liquid diorganoalkenylsiloxy endblocked polydiorganosiloxane, a reinforcing filler and a catalytically effective amount of an organic peroxide. The tensile and recovery properties of the cured elastomer are optimized when the concentration of diorganoalkenylsiloxy units in the liquid polydiorganosiloxane relative to the concentration of repeating units in the peroxide curable polydiorganosiloxane is within specified limits.

DETAILED DESCRIPTION OF THE INVENTION

This invention provides a heat curable polyorganosiloxane elastomer composition comprising 100 parts by weight of a first polydiorganosiloxane (A) having a viscosity of at least 10 pascal seconds (Pa·s) at 25° C. and no detectable concentration of pendant ethylenically unsaturated hydrocarbon radicals; a second polydiorganosiloxane (B) having an average degree of polymerization of from 2 to 400, two diorganoalkenylsiloxy terminal groups per molecule and no detectable concentration of pendant ethylenically unsaturated hydrocarbon radicals, wherein said diorganoalkenylsiloxy terminal groups are diorganoallylsiloxy or diorganovinylsiloxy and from 0.2 to 2 of said diorganoalkenylsiloxy groups are present per 100 diorganosiloxy units present in polydiorganosiloxane A, from 5 to 100 parts by weight of a reinforcing or nonreinforcing filler and a catalytically effective amount of an organic peroxide.

The polyorganosiloxane compositions of this invention contain at least one polydiorganosiloxane (A) that can be cured using an organic peroxide to yield a crosslinked, elastomer product in the absence of any additional polyorganosiloxane reactants. The present compositions also contain at least one polydiorganosiloxane (B), the characterizing feature of these compositions. Polydiorganosiloxane B is a relatively low molecular weight polymer exhibiting an average degree of polymerization ($\overline{DP}_B$) of from 2 to about 400. Preferably neither polydiorganosiloxane A nor B contain detectable amounts of pendant ethylenically unsaturated hydrocarbon radicals, since it is believed that these would adversely affect the properties of the cured elastomer. The presence of polydiorganosiloxane B is apparently responsible for the combination of high values of tensile strength, elongation, tear strength and elastic recovery exhibited by cured elastomers prepared using the present compositions, since this combination is not achieved when polydiorganosiloxane B is omitted from the curable composition. Preferred compositions of this invention can be cured to yield polydimethylsiloxane elastomers exhibiting tensile strengths above 4.8 Megapascals (MPa), maximum elongations of at least 700%, strip tear strengths of at least 7.0 Kilonewton per meter (KN/m) and tension set values of less than 20%.

The major polydiorganosiloxane component, identified as polydiorganosiloxane (A), can be any of the known liquid, semi-solid or "gum" type polydiorganosiloxanes which preferably do not contain detectable concentrations of pendant, i.e., nonterminal, ethylenically unsaturated hydrocarbon radicals such as vinyl and allyl in the polymer molecule.

These types of polymers are described in the art pertaining to heat curable polyorganosiloxane elastomers and typically contain repeating units of the general formula (1) $(R^1)_2SiO$.

For polydiorganosiloxane A of this invention, each $R^1$ is individually selected from alkyl, haloalkyl, cycloalkyl, phenyl, phenylalkyl and alkylphenyl, and typically contains from one up to 8 carbon atoms.

When $R^1$ represents an alkyl radical, it can be, for example, a methyl, ethyl, propyl or butyl radical in addition to higher homologs such as hexyl and octyl. $R^1$ can represent any of the foregoing alkyl radicals wherein one or more hydrogens have been replaced with halogen atoms such as chlorine, bromine or fluorine. Cycloalkyl groups which can be represented by $R^1$ preferably contain from 3 to 8 carbon atoms in the ring and include cyclopropyl and cyclohexyl. Phenylalkyl radicals represented by $R^1$ contain a phenyl radical that is bonded to silicon by means of an alkyl group such as methyl or ethyl and include benzyl and -phenethyl. If $R^1$ represents an alkylphenyl radical, these can be, for example, tolyl and xylyl.

Preferably $R^1$ is lower alkyl containing from 1 to 4 carbon atoms or phenyl, most preferably methyl, phenyl or combinations thereof. When $R^1$ represents a haloalkyl radical, it is most preferably 3,3,3-trifluoropropyl. These preferences are based on the commercial availability of the intermediates, usually diorganodichlorosilanes or cyclic oligomers of the formula (2) $\{OSi(R^1)_2\}_n$, \hfill (2)

where n is typically an integer from 3 to 6, employed to prepare the present polydiorganosiloxanes A and B.

Polydiorganosiloxane A can be a homopolymer, such as polydimethylsiloxane, or a copolymer containing two or more different types of repeating diorganosiloxane groups of the preceding general formula. If polysiloxane A is a copolymer, the various repeating units can be arranged in a random sequence, referred to as a random copolymer, or groups of identical repeating units may alternate along the length of a polymer molecule. The latter arrangement of repeating units is generally referred to as a "block" type copolymer.

While repeating units of polydiorganosiloxanes in general and polydiorganosiloxane A in particular are typically represented by the foregoing formula $R_2^1SiO$, it should be understood that these polymers may also contain from trace amounts up to 0.1% by weight of repeating units of the formulae $SiO_{4/2}$ and/or $R^1SiO_{3/2}$. The impurities responsible for these repeating units are sometimes present in the intermediates from which polydiorganosiloxanes A and B are prepared. Methods for converting these intermediates to the desired polymers, one of which involves hydrolysis and subsequent equilibration in the presence of acidic or basic catalysts, are sufficiently described in the prior art that a detailed discussion in this specification would be superfluous.

The terminal units of polydiorganosiloxane A can be represented by the formula (3) $Q(R^2)_2SiO$ where each $R^2$ is individually selected from the same group of hydrocarbon radicals previously defined for $R^1$. Q is typically a vinyl or other ethlenically unsaturated hydrocarbon radical, a hydroxyl group or other group that will not interfere with subsequent curing of the polydiorganosiloxane to form the desired elastomer. Preferably Q represents hydroxyl or an ethylenically unsaturated hydrocarbon radical such as vinyl or allyl. Most preferably Q is vinyl.

The viscosity of polydiorganosiloxanes suitable for use in the present heat curable compositions as polydiorganosiloxane A typically ranges from liquids to flowable or nonflowable gels, also referred to as "gums," at ambient temperature. The viscosity of these polymers is usually at least 10 pascal seconds (Pa·s) at 25° C. Typical gums exhibit viscosities of 10 kPa·s and above.

Depending upon the properties desired in the final cured elastomer, polydiorganosiloxane A can be a single species such as a polydimethylsiloxane. Alternatively, polydiorganosiloxane A can be a mixture of two or more polymers differing in average molecular weight, composition of repeating units or both.

In preferred embodiments of the present compositions, polydiorganosiloxane A is a polydimethylsiloxane, a poly(methyl-3,3,3-trifluoropropylsiloxane) or a copolymer containing dimethylsiloxane units in combination with diphenylsiloxane units. The properties imparted to cured polydiorganosiloxanes by the presence of methyl, phenyl, 3,3,3-trifluoropropyl and other hydrocarbon radicals represented by $R^1$ in the foregoing formula is well known and does not form part of this invention.

The liquid polydiorganosiloxane referred to in this specification as polydiorganosiloxane B contains from 2 to 400 diorganosiloxane repeating units of the same type previously discussed in connection with polydiorganosiloxane A. The hydrocarbon radicals present in the repeating units of polydiorganosiloxanes A and B may be identical or different, depending upon the properties desired in the final cured elastomer. Regardless of the types of hydrocarbon radicals present in the repeating units, polydiorganosiloxane B is a liquid at ambient temperature and preferably contains an average of up to 200 divalent repeating units per molecule. The terminal groups of the polydiorganosiloxane B molecules can be represented by the general formula

where $R^3$ and $R^4$ are individually selected from the same group of hydrocarbon radicals previously defined for $R^2$ in the terminal groups of polydiorganosiloxane A, and Q' represents a vinyl or allyl group.

Polydiorganosiloxane B may contain up to 0.01% by weight of pendant (nonterminal) ethylenically unsaturated hydrocarbon radicals resulting from by-products or other impurities in the monomers and/or oligomers used to prepare the polydiorganosiloxane, however it is preferable that no detectable amounts of these pendant hydrocarbon groups be present since they will detract from the improvement in physical properties imparted by polydiorganosiloxane B.

The concentration of the

terminal units of polydiorganosiloxane B relative to the total number of repeating units of polydiorganosiloxane A present in the curable compositions of this invention is considered critical to the development of a desirable level of physical properties in the cured elastomer. Typically from 0.2 to 2 of the

terminal units are present for every 100 repeating units of polydiorganosiloxane A. When preparing the curable compositions of this invention, to determine the weight of polydiorganosiloxane B required per 100 grams of polydiorganosiloxane A to achieve the desired ratio of terminal groups in B per 100 silicon atoms of A, it is necessary to determine the number average molecular weight of polydiorganosiloxane B. The most accurate method is to analytically measure the concentration of unsaturated end groups. Since there will be two end groups per linear molecule, the molecular weight of B can be readily determined. When the relatively low molecular weight terminally functional B is combined with A and heated in the presence of an organic peroxide, most preferably a vinyl specific peroxide, it is believed that the functional end groups of B chemically unite with A such that the B molecules serve as a flexible crosslink to convert A into a three-dimensional network. Making the assumption that each B molecule acts as a single crosslink connecting 4/2 (or 2) network chains, the following expression can be used to calculate the weight (in grams) of B that will yield a preselected average distance between crosslinks, represented by $\overline{DP}_{C\,of\,A}$.

$$\text{Wt. B} = [\text{Wt. A}/m_A][MW_B/2\overline{DP}_C \text{ of } A]$$

where $\overline{DP}_{C\,of\,A}$ represents the average number of repeating units of polydiorganosiloxane A between crosslinks resulting from the presence of polydiorganosiloxane B; $m_A$ represents the weight of a repeating unit of polydiorganosiloxane A (in the case of polydimethylsiloxane $m_A$ is 74); and $\overline{MW}_B$ represents the number average molecular weight of polydiorganosiloxane B. For purposes of convenience, the value for Wt. A is arbitrarily selected as 100.

The relationship between $\overline{DP}_{C\,of\,A}$ and the number of terminal, i.e., diorganoalkenylsiloxy, groups of polydiorganosiloxane B present per 100 diorganosiloxane units of polydiorganosiloxane A (represented by X) can be expressed by the equation $\overline{DP}_{C\,of\,A} = 100/X$.

Substitution of this value for $DP_{C\,of\,A}$ in the foregoing expression yields $$\text{Wt. B} = [\text{Wt. A}/m_A][MW_B/2(100/X)] \text{ or}$$

$$\text{W. B} = [\text{Wt. A}/m_A][\overline{MW}_B \times X/200]$$

It has been found that when polydiorganosiloxanes A and B are both polydimethylsiloxanes, the tensile strength and elastic recovery of the cured elastomer are optimized when the concentration of polydiorganosiloxane B terminal units in the curable composition, represented by X in the foregoing equation, is from about 0.2 to 1 unit per 100 repeating units of polydiorganosiloxane A. This optimum range may vary somewhat when at least a portion of the repeating units of polydiorganosiloxanes A and/or B are other than dimethylsiloxane units, however, the optimum range will be within the broad range of 0.2 to 2 terminal units of polydiorganosiloxane B per 100 repeating units of polydiorganosiloxane A that characterizes the curable compositions of this invention.

The present curable compositions also contain an effective amount of a filler, which is preferably a finely divided form of silica having an average surface area within the range from 100 to 600 square meters per gram. Other reinforcing fillers that can be employed in the present compositions include carbon black and silica aerogels. The use of reinforcing fillers to impart processability and useful levels of physical properties to polyorganosilane elastomers is well known, and is disclosed in basic texts on this subject, for example in chapter 8 of *Chemistry and Technology of Silicones* by Walter Noll (English language translation of second German Edition, Academic Press, New York, 1968). In place of the reinforcing filler, a nonreinforcing filler such as finely divided quartz can be employed.

Those forms of finely divided silica that are preferred for use in the present compositions include precipitated silica, fume silica and a form of hydrophobic z silica disclosed in U.S. Pat. No. 4,344,800, issued to M. A. Lutz on Aug. 17, 1982. This patent is hereby incorporated in its entirety into this specification by reference thereto to show a type of silica prepared by combining water, an alkyl silicate, specified alcohols and hydrophobe agents in the presence of a basic catalyst and aging the resultant composition. One preferred filler of this type is obtained from the alkaline hydrolysis of $Si(OCH_3)_4$ in the presence of at least 70% of one-half of the stoichiometric amount of water required to completely hydrolyze the theoretical amount of $—OCH_3$ radicals present in the $Si(OCH_3)_4$, at least one alcohol selected from the group consisting of methanol, ethanol, n-propanol and isopropanol, at least one basic catalyst, and at least one organosilicon hydrophobing compound selected from the group consisting of $[(CH_3)_3Si]_2NH$, $[(CH_3)_2(CF_3CH_2CH_2)Si]_2NH$, $[(CH_3)R'''SiO]_e$, $CH_3O[(CH_3)R'''SiO]_dR''''$ and $(CH_3)R'''Si(OR'')_2$ where $R'''$ is a methyl radical, the average value of d is from 1 to 12, inclusive, and the average value of e is from 3 to 6, inclusive. The hydrophobing compound is added prior to gellation of the material formed upon hydrolysis of the $Si(OCH_3)_4$.

The concentration of reinforcing filler is typically from 10 up to 80 parts by weight per 100 parts by weight of polydiorganosiloxane A. The optimum filler content for a particular formulation is dependent upon a number of variables, including the viscosity of the unfilled composition and the physical properties, particularly hardness and elongation, desired in the cured elastomer.

To avoid an interaction known as "crepe hardening" or "crepe aging" that may occur between polydiorganosiloxanes and reinforcing silica fillers, it is usually desirable to replace at least a portion of the silanol groups present on the surface of the filler particles with organosiloxy groups. This is typically accomplished using an organosilicon compound such as a cyclic diorganosiloxane oligomer or a low viscosity polydimethylsiloxane containing an average of 2 or more silicon-bonded hydroxyl groups. The silica can be combined with the organosilicon compound prior to being incorporated into the curable compositions of this invention or the silica and treating agent can be added as individual components during preparation of the curable composition. The amount of anticrepe-hardening agent is typically from 15 to 40% of the weight of silica filler. Preferred anticrepe-hardening agents include hydroxy-terminated polydimethylsiloxanes having an average degree of polymerization of from 5 to about 20 and cyclic diorganosiloxanes containing from 3 to 6 silicon atoms per molecule.

The fourth component required to prepare the curable polysiloxane compositions of this invention is at least one organic peroxide, which is preferably of the type known in the art as "vinyl specific." This class of peroxides includes alkyl peroxides wherein the peroxy group is typically bonded to at least one tertiary alkyl radical such as the t-butyl radical. Examples of such vinyl-specific peroxides are di-t-butyl peroxide and 2,5-dimethyl-2,5-di-t-butylperoxyhexane. The concentration of peroxide should be 0.3 to about 2 percent of the combined weights of polydiorganosiloxanes A and B present in the curable composition.

The preference for vinyl specific peroxides is based on the larger degree of improvement in tensile and recovery properties achieved using these peroxides in place of nonvinyl specific peroxides such as t-butyl peroxybenzoate. The accompanying examples demonstrate that a significant improvement in tensile and recovery properties is achieved using a polydiorganosiloxane B component with nonvinyl specific peroxides when these properties are compared with peroxide cured polydiorganosiloxane compositions containing pendant vinyl radicals and no polydiorganosiloxane B component.

Optional ingredients which can be present in the compositions of this invention include extending fillers such as ground quartz, pigments, flame retarding agents such as finely divided platinum alone or in combination with carbon black, and stabilizers to increase the resistance of cured elastomers to degradation in the presence of heat and/or ultraviolet light.

The heat curable polysiloxane compositions of this invention are prepared by mixing together amounts of polydiorganosiloxanes A and B within the scope of this invention, filler, and vinyl-specific organic peroxide using methods known to one skilled in the art. In accordance with one of these methods, the compositions are conveniently prepared using a two roll differential speed mill. Larger amounts of ingredients can be blended in commercial scale dough type or "sigma-blade" mixers such as a Baker Perkins ® mixer. The peroxide component is added to the composition at a temperature that will avoid premature decomposition of the peroxide.

Once the ingredients of the present curable compositions are thoroughly blended, the compositions are formed into the desired final shape by molding, extrusion, calendering or other conventional fabrication means. The resultant shaped articles are then heated to temperatures of between about 150° and 250° C. for a sufficient time to decompose the peroxide, cure the elastomer and develop useful levels of physical properties. If the elastomer will be used in applications which require that specified properties such as elongation, tear strength and modulus be retained during prolonged exposures to temperatures of up to 250° C., it is usually desirable to further stabilize the elastomer against property changes by post-curing it at temperatures of from 200° to 250° C. for periods of up to 24 hours. This treatment effectively stabilizes the desired properties against substantial changes during the end use application of the elastomer.

Elastomers prepared using the curable compositions of this invention are suitable for most of the known end use applications for heat curable silicone elastomers. The present elastomers are particularly useful for those applications requiring retention of tensile and tear strength and elongation during and following prolonged exposures to temperatures above 200° C., such as would be encountered in internal combustion engines and high power electronic devices.

The following examples disclose certain preferred embodiments of the curable compositions of this invention and should not be interpreted as limiting the scope of the invention defined in the accompanying claims. Unless otherwise specified, all parts and percentages are by weight.

The examples used to obtain the tensile and recovery properties reported in the tables accompanying the examples were cut from molded sheets prepared using a steel chase having mold cavities measuring 0.06 inch (0.15 cm) in depth. The samples were molded in a hydraulic press at a temperature of from 170° to 175° C. for 15 minutes, cooled, removed from the mold, and then post-cured for 4 hours at 200° C. in a circulating air oven.

The tensile and recovery properties of the cured test samples were measured using an Instron ® model TTD tester equipped with an extensometer and a crosshead speed of 10 inches (25 cm.) per minute, or with a Scott model L-6 tester. Three samples were used to obtain each of the values for tensile strength, elongation and modulus reported in the following tables, and the values are an average of those falling within 10% of the highest value measured. When the difference between the highest and lowest values for the 3 samples exceeded 10%, only the two highest values were averaged if they were within the 10% range. In this instance it was assumed that the lowest value was the result of flaws in the test sample.

Durometer values were obtained using a 3 ply sample having an overall thickness of about 0.18 inch (0.45 cm) and a Shore A durometer.

Test samples for the strip tear test, sometimes referred to in the literature as the "trouser leg tear test" were cut from cured sheets of elastomer using a template. The samples measured 0.5 inch (1.25 cm) wide, 4.0 inches (10 cm) long and 0.06 (0.15 cm) thick, and contained a 1.5 inch (3.8 cm) long slit that bisected, was perpendicular to and terminated at one of the 0.5 inch (1.25 cm) sides, resulting in the formation of two identical strips. The samples were tested for tear strength by securing the free end of each strip in one of the jaws of a Instron model TTD tester and using a crosshead speed of 10 inches (25 cm) per minute.

The foregoing procedure for the strip tear test is described by Rivlin and Thomas [Journal of Polymer Science, 10, 291 (1953)] and by Greensmith and Thomas [Journal of Polymer Science, 18, 189–200 (1955)]. It was found that the tear strength values based on propagation of the initial cut were more reproducible and reliable than the values required to completely separate the two strips. This phenomenon is believed to result from slight variations in the tear path during the course of testing the samples. Both values (propagation and separation) are reported in the following tables.

The test employed to determine tension set values is described in section 5.5 of ASTM test method D-412 and the original sample length is one inch (2.5 cm). The procedure described in ASTM test method D-395 was used to measure compression set values. During the latter procedure the sample was compressed for 22 hours at a temperature of 150° C.

EXAMPLE 1

This example demonstrates the improvement in tensile properties and tear strength that can be achieved using as a crosslinking agent preferred diorganoalkenylsiloxy-terminated polydiorganosiloxanes, i.e., polydiorganosiloxane B, of the present invention, relative to a formulation which is crosslinked by the reaction of a vinyl-specific peroxide with a polydiorganosiloxane gum containing a plurality of pendant (i.e., nonterminal) vinyl groups bonded to silicon.

The ingredients employed to prepare the compositions described in this examples are identified using the following terminology, which is also employed in the preceding specification and accompanying claims.

Polydiorganosiloxane A—a dimethylvinylsiloxy endblocked polydimethylsiloxane gum exhibiting a Williams plasticity of from 50 to 60 mils (0.13–0.15 cm.).

The polydimethylsiloxane employed as the control was a dimethylvinylsiloxy endblocked dimethylsiloxane/methylvinylsiloxane copolymer wherein 99.858 mol % of the repeating units are dimethylsiloxy and the remaining 0.142 mol % are methylvinylsiloxy. This is equivalent to 1 vinyl-containing organosiloxane group per 704 dimethylsiloxane groups. The Williams plasticity of the control polymer was from 55 to 65 mils (0.14–0.17).

Polydiorganosiloxane B—a liquid dimethylvinylsiloxy endblocked polydimethylsiloxane. The polymers employed in this example exhibited average degrees of polymerization ($\overline{DP}_B$) of 28.9, 41.4, 62.9, 75.5 and 96.4, determined from the vinyl content of the polymer. These polymers were prepared by a potassium silanolate catalyzed equilibration reaction between 1) a source of terminal groups, specifically a dimethylvinylsiloxy endblocked polydimethylsiloxane having an average of 8.3 dimethylsiloxane groups per molecule and 2) the calculated stoichiometric amount, plus an additional 10% by weight, of a mixture of cyclic dimethylsiloxane oligomers to provide a ($\overline{DP}_B$ within the desired range following removal of cyclic oligomers formed during equilibration of the reaction mixture.

Silica filler - a hydrophobic silica prepared using a procedure similar to the one described in examples 10–21 of U.S. Pat. No. 4,344,800, which is referred to in the foregoing specification. The hydrophobing agent, hexamethylcyclotrisiloxane (192 g.), was dissolved in 306 cc of a methanolic ammonia solution and 786 cc of methanol before being combined with 270 cc of concentrated aqueous ammonium hydroxide and 720 cc of methyl orthosilicate. The pseudogel which formed following addition of the methyl orthosilicate was allowed to age under ambient conditions for at least 48 hours prior to being formulated into a polyorganosiloxane composition.

The polysiloxane compositions were prepared by combining the amounts of polydiorganosiloxanes A and B specified in Table 1 with 240 parts of the foregoing silica composition, equivalent to a dry silica concentration of 60 parts, on a small 2-roll mill. Following addition of the silica composition, the rolls were heated to about 110° C. using steam. Each composition was milled until it became clear, which required about 12 minutes, followed by an additional 20 minute milling period. The mill rolls were then cooled by circulating water through them. When the composition cooled to about 25° C., 0.5 part of 2,5-dimethyl-2,5-di-t-butylperoxyhexane, a vinyl-specific peroxide, was added and blending was continued for an additional 5 minutes.

The relative amounts of polydiorganosiloxanes A and B in the test samples were calculated to achieve a concentration of 0.284 dimethylvinylsiloxy end group of polydiorganosiloxane B per 100 dimethylsiloxane units of polydiorganosiloxane A.

The polydiorganosiloxane employed as a control contained an average of 0.142 methylvinylsiloxane unit per 100 dimethylsiloxane units. The number of crosslinks in the final cured polymer would therefore be expected to be equivalent to the number of crosslinks provided by polydiorganosiloxane B. This would be expected since the reaction of the 2 terminal unsaturated groups of polymer B is equivalent to 1 pendant vinyl group in polymer A relative to the average frequency of inserting crosslinks along polymer A molecules.

The compositions of the samples tested are summarized in the accompanying Table 1 and their properties are listed in Table 2.

TABLE 1

| Composition | Polydiorganosiloxane A (parts) | Polydiorganosiloxane B (parts) | $\overline{DP}_B$ |
|---|---|---|---|
| a (control) | 100[1] | 0 | — |
| b | 95.97 | 4.03 | 28.9 |
| c | 94.35 | 5.65 | 41.4 |
| d | 91.69 | 8.31 | 62.9 |
| e | 90.2 | 9.8 | 75.5 |
| f | 87.84 | 12.16 | 96.4 |

[1]Sample a contained a copolymer having dimethylsiloxane and methylvinylsiloxane groups. Samples b–f contained a polydimethylsiloxane homopolymer having dimethylvinylsiloxy terminal groups as polydiorganosiloxane A.
Note:
In addition to polydiorganosiloxanes A and B, all samples contained 60 parts (dry weight) of the treated silica described in example 1 and 0.5 part of 2,5-dimethyl-2,5-di-t-butylperoxyhexane.

TABLE 2

| Composition | Tensile Strength (MPa) | Elongation (%) | Modulus (MPa) @ 100% elongation | Tear Strength (kN/m) Propagation | Separation |
|---|---|---|---|---|---|
| a (control) | 11.1 | 685 | 1.31 | N.D. | 8.0 |
| b | 11.9 | 980 | 1.21 | 6.0 | 12.0 |
| c | 12.5 | 1008 | 1.12 | 7.0 | 11.2 |
| d | 11.3 | 920 | 1.24 | 7.2 | 11.6 |
| e | 12.0 | 975 | 1.29 | 7.4 | 12.6 |
| f | 12.8 | 973 | 1.30 | 6.7 | 12.6 |

MPa = megapascals
kN/m = kilonewtons per meter
N.D. = not detectable from stress vs. strain plot obtained during testing of sample The data in Table 2 demonstrate the considerably higher values of tensile strength, elongation and tear strength and the comparable modulus at 100% elongation achieved when a relatively low molecular weight polydiorganosiloxane containing vinyl only in the terminal groups is employed as a crosslinking molecule for a polydiorganosiloxane that does not contain any pendant (i.e., nonterminal) ethylenically unsaturated hydrocarbon groups. The retention of equivalent modulus (at 100% elongation) values is preferred, because this modulus range is characteristic of desirable elastomeric materials. The increase in tensile and tear strength was therefore achieved without sacrificing the desirable elastomeric properties of the sample.

EXAMPLE 2

This example demonstrates the effect of varying the molar concentration of crosslinking molecule (polydiorganosiloxane B) on the tensile properties and tear resistance of a cured polydiorganosiloxane elastomer. The cured elastomer samples were prepared as described in the foregoing Example 1 using the relative amounts of polydiorganosiloxanes A and B specified in Table 3. Polydiorganosiloxanes A and B are defined in Example 1. The particular polysiloxane B employed exhibited an average degree of polymerization ($\overline{DP}_B$) of 96.4. In addition to the two polydimethylsiloxanes, the composition also contained 60 parts (dry weight) of hydrophobic silica particles that were prepared as described in the foregoing Example 1 and 0.5 parts of 2,5-dimethyl-2,5-di-t-butylperoxyhexane.

The tensile strength, elongation, modulus at 100% elongation and tear strength of the four compositions tested are summarized in Table 4.

TABLE 3

| Composition | Polydiorganosiloxane A (parts) | Polydiorganosiloxane B $\overline{DP}_B$ = 96.4 (parts) | Crosslink Index[1] |
|---|---|---|---|
| g | 83.76 | 16.24 | 0.40 |
| h | 86.09 | 13.91 | 0.33 |
| i | 87.84 | 12.16 | 0.29 |
| j | 89.19 | 10.81 | 0.25 |

[1]Crosslink Index = The number of dimethylvinylsiloxane units of polyorganosiloxane B present per 100 dimethylsiloxane units of polydiorganosiloxane A.

TABLE 4

| Composition | Tensile Strength (MPa) | Elongation (%) | Modulus (MPa @ 400% elongation) | Tear Strength (kN/m) Propagation | Separation |
|---|---|---|---|---|---|
| g | 11.96 | 718 | 4.25 | 7.5 | 13.1 |
| h | 12.44 | 763 | 3.85 | 6.5 | 12.5 |
| i | 13.09 | 808 | 3.54 | 7.0 | 11.0 |
| j | 12.79 | 840 | 2.94 | 6.5 | 12.7 |

The data in Table 4 demonstrate that tensile strength and elongation increase as the concentration of dimethylvinylsiloxane units contributed by polydiorganosiloxane B decreases. However, the tear strength shows little change, all of the values being considerably superior to the control as shown in Table 2 of example 1 hereinabove.

EXAMPLE 3

This example demonstrates the improvement in tensile and recovery properties achieved when a low molecular weight dimethylvinyl endblocked dimethylsiloxane/diphenylsiloxane copolymer is added to a curable formulation containing a dimethylvinyl endblocked organosiloxane copolymer gum having the same composition of repeating units as the additive, a treated silica filler and a nonvinyl specific peroxide.

The curable formulation from which the test samples were prepared contained 100 parts of a dimethyl endblocked organosiloxane copolymer gum exhibiting a Williams plasticity of 100 mils (0.25 cm.) as polydiorganosiloxane A. The copolymer contained 94.5 mol % of dimethylsiloxane units and 5.5 mol % of diphenylsiloxane units, 60 parts of a finely divided treated silica wherein at least a portion of the silanol groups on the surface of the particles were converted to trimethylsiloxy groups, 0.5 part of t-butylperbenzoate, a nonvinyl specific peroxide amounts, as specified in Table 7, of a liquid dimethylvinyl endblocked organosiloxane copolymer (B) having an average degree of polymerization of 140 and containing 94.5 mol % dimethylsiloxane units and 5.5 mol % diphenylsiloxane units.

The test samples were prepared as described in the foregoing example 1. The molding conditions were 10 minutes at 150° C. and the samples were post-cured for 24 hours at 250° C., at which time the properties disclosed in Table 5 were measured.

TABLE 5

| Amount of B (parts)/ Me$_2$ViSio conc.[1] | Compression Set (%) | Tensile Strength (MPa) | Elongation (%) | Tension Set (%) | Tear Strength (KN/m) |
|---|---|---|---|---|---|
| 0/0 (control) | 35.4 | 9.0 | 810 | 20 | 11.0 |
| 4/0.0572 | 27.5 | 12.1 | 840 | 15 | 15.2 |
| 8/0.114 | 31.0 | 12.3 | 800 | 10 | 15.0 |
| 16/0.229 | 16.5 | 13.4 | 780 | 9 | 14.0 |
| 24/0.343 | 17.9 | 11.2 | 710 | 8 | 14.5 |
| 32/0.456 | 21.4 | 9.1 | 640 | 5 | 6.1 |

[1]Number of Me$_2$ViSio groups in B per 100 diorganosiloxane groups in gum polymer (A)

The data in Table 5 demonstrate that the improvements in tensile properties imparted by the particular embodiment of polydiorganosiloxane B employed in this example appear to be optimized when the concentration of endgroups of this polymer is in the range of 0.23 dimethylvinylsiloxy group per 100 diorganosiloxane units present in the copolymer gum.

EXAMPLE 4

This example demonstrates the effect of various fillers on the tensile and recovery properties of (1) a cured elastomer prepared using a curable composition of this invention, and (2) a cured elastomer prepared using a polydiorganosiloxane containing a concentration of pendant vinyl groups equal to the number of terminal units present in the liquid polydiorganosiloxane component of (1).

In this example polydiorganosiloxane A was present at a concentration of 100 parts and was identical in composition of repeating units and plasticity range to the polydiorganosiloxane A of example 1. Polydiorganosiloxane B was a liquid dimethylvinylsiloxy endblocked polydimethylsiloxane exhibiting an average degree of polymerization of 41.4 and was present at a concentration of 5.65 parts. This is equivalent to 0.268 dimethylvinylsiloxy group of polydiorganosiloxane B per 100 dimethylsiloxy units of polydiorganosiloxane A. The composition also contained 0.7 part of 2,5-dimethyl-2,5-di-t-butylperoxyhexane, a vinyl specific peroxide, in addition to the type and amount of filler described below.

The control formulations identified as samples 1, 3, 5 and 7 in Table 6, contained 100 parts of the siloxane/methylvinylsiloxane copolymer described in example 1 in addition to the same type and amount of filler and peroxide as the composition to which it was being compared.

The fillers employed in the formulations and the concentration of each filler were as follows:

Filler 1 - Ground quartz having an average particle size of 5 microns; concentration—90 parts.

Filler 2 - Diatomaceous earth, manufactured under the tradename Cellite Superfloss ®; concentration—78.1 parts Filler 3 - Fume silica which had been treated to replace original silanol groups with trimethylsiloxy groups; concentration—60.8 parts Filler 4 - hydrophobic silica prepared as described in example 1 at a concentration of 53.8 parts. The hydrophobing agent was an organosiloxane prepared by equilibrating equimolar amounts of methyltrimethoxysilane and dimethylsiloxane as octamethylcyclotetrasiloxane and was employed at a concentration of 40%, based on the weight of silica.

Test samples were molded as described hereinbefore and post-cured for 4 hours at a temperature of 200° C.

TABLE 6

| Sample No. | 1[a] | 2 | 3[a] | 4 | 5[a] | 6 | 7[a] | 8 |
|---|---|---|---|---|---|---|---|---|
| Filler No. | 1 | 1 | 2 | 2 | 3 | 3 | 4 | 4 |
| Tensile Strength (MPa) | 3.85 | 4.55 | 3.93 | 4.42 | 10.42 | 11.66 | 11.25 | 14.15 |
| Modulus @ 100% elongation (MPa) | 1.31 | 0.90 | 3.24 | 2.42 | 1.45 | 1.17 | 1.66 | 1.52 |
| Max. Elongation (%) | 215 | 295 | 145 | 235 | 500 | 670 | 560 | 900 |
| Strip Tear Strength Propagation (KN/m) | 0.21 | 0.42 | 0.53 | 0.70 | 1.93 | 2.62 | 4.38 | 5.34 |
| Break (kN/m) | 0.35 | 0.47 | 0.70 | 1.03 | 4.76 | 9.07 | 10.92 | 11.80 |

[a]Samples 1, 3, 5 and 7 were controls containing a dimethylsiloxy/methylvinylsiloxy copolymer.

The foregoing data demonstrate that the properties of a cured polydiorganosiloxane elastomer are substantially affected by the type of filler present. The data also demonstrate that irrespective of the type of filler, a substantial improvement in physical properties is imparted by the liquid polydiorganosiloxane component (polydiorganosiloxane B) of the present curable compositions when compared with a curable composition wherein a high molecular weight polydiorganosiloxane containing pendant vinyl groups is the only curable polydiorganosiloxane species present in the composition, as in samples 1, 3, 5 and 7 of Table 6.

EXAMPLE 5

This example demonstrates the high levels of tear strength and elongation obtained using a hydroxyl endblocked poly(methyl-3,3,3-trifluoropropyl)siloxane as polydiorganosiloxane A in combination with a polydiorganosiloxane B of this invention.

Test samples were prepared using the procedure disclosed in example 1. The curable composition contained the following ingredients:

40 parts of a hydroxyl endblocked poly(methyl-3,3,3-trifluoropropyl)siloxane exhibiting a Williams plasticity within the range of from 90 to 140 mils (0.23–0.36 cm), an amount specified in Table 6 of a dimethylvinyl-siloxy-endblocked polydimethylsiloxane (polydiorganosiloxane B) exhibiting an average degree of polymerization of 28.9, 21.4 parts of fume silica which had been previously treated with 52 parts of 2,4,6-trimethyl-2,4,6-tri(3,3,3-trifluoropropyl) cyclotrisiloxane and 1.0 part hexamethyldisilazane for each 250 parts of silica.

The foregoing ingredients were blended for 15 minutes on a two-roll mill heated to a temperature of 105° C., cooled, after which time 0.28 part of 2,5-dimethyl-2,5-di-t-butyl-peroxyhexane was added. The test samples were cured in the press for 15 minutes at a temperature of 170° C. and post-cured for four hours at 200° C.

Samples of a control formulation were prepared in the same manner as the other test samples and contained 40 parts of a hydroxyl-endblocked polydiorganosiloxane exhibiting a Williams plasticity within the range from 95 to 125 mols (0.24–0.32 cm), wherein 99.404 mol % of the repeating units were methyl-3,3,3-trifluoropropylsiloxane units and the remaining 0.596 mol % were methylvinylsiloxane units, 20 parts of the treated silica described in the foregoing section of this example and 0.28 part of 2,5-dimethyl-2,5-di-t-butylperoxyhexane.

All of the control samples were tested as described hereinbefore. The data from all tests are recorded in the following Table 7.

TABLE 7

| Sample No. | 1 | 2 | 3 | 4 (control) |
|---|---|---|---|---|
| Polydiorganosiloxane B (parts) | 1.4 | 2.8 | 5.6 | 0 |
| Crosslink Index | 0.5 | 1.0 | 2.0 | 0.6[1] |
| Tensile Strength (MPa) | 12.9 | 12.3 | 11.7 | 12.3 |
| Elongation (%) | 365 | 385 | 475 | 290 |
| Modulus @ 100% Elongation (MPa) | 260 | 205 | 150 | 350 |
| Tear Strength at Break (KN/m) | 26.6 | 25.9 | 49 | 15.7 |

[1]Crosslink index based on concentration of pendant vinyl groups in polymer

The foregoing data demonstrate that the tear strength and elongation are improved when the crosslinks provided by a polydiorganosiloxane having pendant vinyl groups are replaced by crosslinks provided by a low molecular weight polydiorganosiloxane B of this invention.

That which is claimed is:

1. A heat curable polyorganosiloxane composition comprising
   100 parts by weight of a first polydiorganosiloxane (A) having a viscosity of at least 10 Pa·s at 25° C. and no detectable concentration of pendant ethylenically unsaturated hydrocarbon radicals;
   a second polydiorganosiloxane (B) having an average degree of polymerization of from 2 to 400, two diorganoalkenylsiloxy terminal groups per molecule and no detectable concentration of pendant ethylenically unsaturated hydrocarbon radicals, wherein said diorganoalkenylsiloxy terminal groups are represented by the formula $$\begin{array}{c} R^3 \\ | \\ Q'SiO- \\ | \\ R^4 \end{array}$$

where $R^3$ and $R^4$ each contain from 1 to 8 carbon atoms and are individually selected from the group consisting of alkyl, haloalkyl, cycloalkyl, phenyl, phenylalkyl, and alkylphenyl, $Q'$ is vinyl or allyl, and the relative concentration of polydiorganosiloxane B is such that from 0.2 to 2 of said diorganoalkenylsiloxy groups are present per 100 diorganosiloxy units present in polydiorganosiloxane A;
   from 10 to 80 parts by weight of a reinforcing or nonreinforcing filler;
   and a catalytically effective amount of an organic peroxide.

2. A heat curable composition according to claim 1 where polydiorganosiloxane A and polydiorganosiloxane B consist essentially of repeating units and terminal groups, and where said repeating units are represented by the formula $R_2SiO$, where each R is a monovalent radical containing from 1 to 8 carbon atoms and is individually selected from the group consisting of alkyl, haloalkyl, cycloalkyl, phenyl, alkylphenyl and phenylalkyl.

3. A heat curable composition according to claim 2 where R is methyl, phenyl or 3,3,3-trifluoropropyl.

4. A heat curable composition according to claim 2 where the terminal groups of polydiorganosiloxane A are dimethylvinylsiloxy or dimethylhydroxylsiloxy.

5. A heat curable composition according to claim 2 where the terminal groups of polydiorganosiloxane B are diorganovinylsiloxy.

6. A heat curable composition according to claim 5 where said diorganovinylsiloxy is dimethylvinylsiloxy.

7. A heat curable composition according to claim 2 wherein polydiorganosiloxane A is a dimethylvinylsiloxy terminated polydimethylsiloxane, a hydroxyl-terminated polymethyl-3,3,3-trifluoropropylsiloxane or a dimethylvinyl terminated dimethylsiloxane/diphenylsiloxane copolymer.

8. A heat curable composition according to claim 2 wherein polydiorganosiloxane B is a dimethylvinylsiloxy terminated polydimethylsiloxane or a dimethylvinylsiloxy-terminated dimethylsiloxane/diphenylsiloxane copolymer 9. A heat curable composition according to claim 1 where said filler comprises a finely divided form of silica.

10. A heat curable composition according to claim 1 where said organic peroxide is a vinyl specific peroxide.

11. A heat curable composition according to claim 10 where said vinyl specific peroxide is 2,5-dimethyl-2,5-di-t-butylperoxyhexane and is present at a concentration of from 0.1 to 2 percent, based on the combined weights of polydiorganosiloxanes A and B.

12. A heat curable composition according to claim 1 where said organic peroxide is t-butylperbenzoate.

13. A method for preparing a heat curable polyorganosiloxane elastomer exhibiting improved tensile and recovery properties relative to elastomers prepared by curing polydiorganosiloxanes containing pendant vinyl groups, said method comprising the steps of
   (I) preparing a heat curable polyorganosiloxane composition by mixing together ingredients comprising
   100 parts by weight of a first polydiorganosiloxane (A) having a viscosity of at least 10 Pa·s at 25° C. and no detectable concentration of pendant ethylenically unsaturated hydrocarbon radicals;
   a second polydiorganosiloxane (B) having an average degree of polymerization of from 2 to 400, two diorganoalkenylsiloxy terminal groups per molecule and no detectable concentration of pendant ethylenically unsaturated hydrocarbon radicals, wherein said diorganoalkenylsiloxy terminal groups are represented by the formula

where $R^3$ and $R^4$ each contain from 1 to 8 carbon atoms and are individually selected from the group consisting of alkyl, haloalkyl, cycloalkyl, phenyl, phenylalkyl, and alkylphenyl, Q' is vinyl or allyl, and the relative concentration of polydiorganosiloxane B is such that from 0.2 to 2 of said diorganoalkenylsiloxy groups are present per 100 diorganosiloxy units present in polydiorganosiloxane A;

from 10 to 80 parts by weight of a reinforcing or nonreinforcing filler;

and a catalytically effective amount of an organic peroxide; and (II) heating the resultant curable polyorganosiloxane composition to cure it to an elastomer.

14. A method according to claim 13 where said organic peroxide is dicumyl peroxide or 2,5-dimethyl-2,5-di-t-butylperoxyhexane and is present at a concentration of from 0.1 to 2 percent, based on the combined weights of polydiorganosiloxanes A and B.

15. A method according to claim 13 where said ingredients are mixed together using a two-roll mill or a dough type mixer.

16. A method according to claim 13 wherein the filler is a hydrophobic reinforcing silica obtained from the alkaline hydrolysis of $Si(OCH_3)_4$, in the presence of at least 70% of one-half of the stoichiometric amount of water required to completely hydrolyze the theoretical amount of $-OCH_3$ radicals present in the $Si(OCH_3)_4$, at least one alcohol selected from the group consisting of methanol, ethanol, n-propanol and isopropanol, at least one basic catalyst, and at least one organosilicon hydrophobing compound selected from the group consisting of $[(CH_3)_3Si]_2NH$, $[(CH_3)_2(CF_3CH_2CH_2)Si]_2NH$, $[(CH_3)R'''SiO]_e$, $CH_3O[(CH_3)R'''SiO]_dR''''$ and $(CH_3)R'''Si(OR'')_2$ where $R'''$ is a methyl radical, a 3,3,3-trifluoropropyl radical or a vinyl radical, each $R''''$ is hydrogen or a methyl radical, the average value of d is from 1 to 12, inclusive, and the average value of e is from 3 to 6, inclusive, said hydrophobing material being added prior to gellation of the compound formed upon hydrolysis of the $Si(OCH_3)_4$.

17. A method according to claim 13 where said composition is post-cured by heating it at a temperature of from 150° to 250° C. for up to 24 hours.

* * * * *

UNITED STATES PATENT AND TRADEMARK OFFICE
CERTIFICATE OF CORRECTION

PATENT NO. : 4,444,940

DATED : April 24, 1984

INVENTOR(S) : Keith E. Polmanteer

It is certified that error appears in the above-identified patent and that said Letters Patent is hereby corrected as shown below:

In column 1, line 33, "polymer mer units" should read -- polymer units --.

In column 6, lines 30 and 50, "$MW_B$" should read -- $\overline{MW}_B$ --.

In column 6, lines 30 and 47, "$DP_{C \text{ of } A}$" should read -- $\overline{DP}_{C \text{ of } A}$ --.

In column 6, line 53 "W.B" should read -- Wt. B --.

In column 7, line 18, "hydrophobic z silica" should read -- hydrophobic silica --.

In column 10 line 41, "$(\overline{DP}_B$" should read -- $(\overline{DP}_B)$ --.

UNITED STATES PATENT AND TRADEMARK OFFICE
CERTIFICATE OF CORRECTION

PATENT NO. : 4,444,940

DATED : April 24, 1984

INVENTOR(S) : Keith E. Polmanteer

It is certified that error appears in the above-identified patent and that said Letters Patent is hereby corrected as shown below:

In column 10, line 13, "this" should read -- these --.

In column 13, Table 5, "Sio" should read -- SiO --.

Signed and Sealed this

Twelfth Day of March 1985

[SEAL]

Attest:

DONALD J. QUIGG

Attesting Officer    Acting Commissioner of Patents and Trademarks